S. R. KING.
LIGHT DIMMING EYE PROTECTOR.
APPLICATION FILED MAY 17, 1917.
1,255,430.
Patented Feb. 5, 1918.
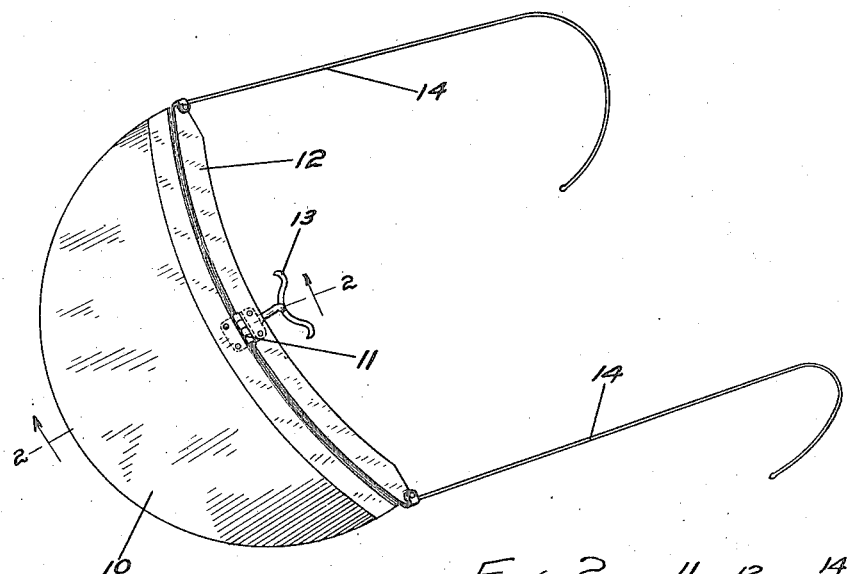
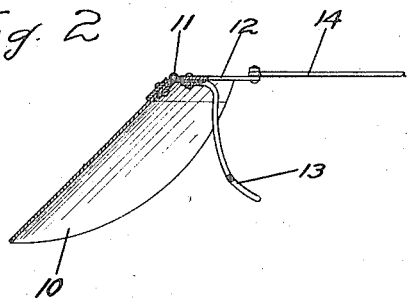
INVENTOR
Samuel R. King
BY
A. M. Wooster
ATTORNEY

UNITED STATES PATENT OFFICE.

SAMUEL R. KING, OF GLENBROOK, CONNECTICUT.

LIGHT-DIMMING EYE-PROTECTOR.

1,255,430.  Specification of Letters Patent.  Patented Feb. 5, 1918.

Application filed May 17, 1917. Serial No. 169,359.

*To all whom it may concern:*

Be it known that I, SAMUEL R. KING, a citizen of the United States, residing at Glenbrook, county of Fairfield, State of Connecticut, have invented an Improvement in Light-Dimming Eye-Protectors, of which the following is a specification.

This invention has for its object the production of a simple and inexpensive light dimming eye protector adapted for general use, and especially adapted for use by chauffeurs and drivers as a protection against the glare of the head lights on an approaching automobile, trolley car or locomotive, and by soldiers, as artillerists, on bright days, in aeroplane and other work, which shall be provided with convenient means for attaching it to the head, or to the brim of a hat or the vizor of a cap, and which may be conveniently swung into operative or inoperative position and will remain in any position in which it is placed.

With these and other objects in view, I have devised the novel eye protector which I will now describe, referring to the accompanying drawing forming a part of this specification, and using reference characters to indicate the several parts.

Figure 1 is a perspective view, illustrating a form of my novel eye protector, adapted for attachment to the head by means of bows, like spectacles, and Fig. 2 a section on the line 2—2 in Fig. 1, looking in the direction of the arrows.

10 denotes the protector, which is preferably given the general configuration of an ordinary eye shield, and may be made of any suitable translucent or semi-transparent material, as celluloid, colored glass or gauze and of any suitable color that will reduce the intense glare of a head light to tolerance and still provide clear vision, so that a driver may retain control of his team, or a chauffeur of his automobile, and will be able to avoid injury to his own team or car, as well as to avoid injury to others. The protector 10 is hinged at the middle of its inner concave edge to the middle of the convex edge of a carrier 12, the inner edge of which is curved to fit the forehead of the wearer. This carrier is formed of a material which is relatively light, but of course, sufficiently rigid to retain its form under the ordinary conditions of use. This bar is provided centrally with a bridge piece 13, which is adapted to rest upon the bridge of the nose and retain the hinged edge of the protector well above the eyes. 14 denotes bows which are pivoted to the ends of the carrier in such a manner as to swing in the horizontal plane, like the bows of spectacles.

It will, of course, be obvious that for certain uses it might be desirable to substitute an opaque for a translucent or semi-transparent protector. This would be within the scope of the invention which is not limited to any special degree of opacity of the protector. In other words, the protector may be more or less opaque, or may be entirely opaque and serve as a shade if preferred. The operation will be readily understood from the drawing. The protector may be swung upward out of the way when not in use, and swung downward before the eyes as a protection against the glare of head lights or of the sun, and when not required may be easily and quickly removed and placed in a case and as easily applied to a cap vizor or hat brim when again required.

It will be noted that the carrier 12, by reason of its reasonably close fit to the forehead of the wearer, will prevent rays of light from passing downwardly between the forehead and the rear edge of the shield. In this way ample protection for the eyes is provided where the source of light is directly above the wearer.

Having thus described my invention, I claim:—

1. An eye protector comprising a carrier in the form of a flat strip having its inner edge curved to fit the wearer's forehead, bows hinged to the ends of said strip, and a curved protector or shield hinged at the middle of its inner edge to the middle of the outer edge of the carrier, whereby the carrier is held against the head and light is prevented from passing to the rear thereof.

2. An eye protector comprising a carrier in the form of a flat strip having its inner edge curved to fit the wearer's forehead, bows hinged to the ends of said strip, a curved protector or shield hinged at the middle of its inner edge to the middle of the outer edge of the carrier, whereby the carrier is held against the head and light is prevented from passing to the rear thereof, and a nose piece secured to the middle of said carrier contiguous to the hinge connection of the shield, said nose pieces extending downwardly from the carrier.

In testimony whereof I affix my signature.

SAMUEL R. KING.